United States Patent
Cui et al.

(10) Patent No.: US 12,403,716 B2
(45) Date of Patent: Sep. 2, 2025

(54) OPTICAL ANTI-COUNTERFEITING ELEMENT AND ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Haibo Cui, Beijing (CN); Baoli Zhang, Beijing (CN); Xiaoli Wang, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 684 days.

(21) Appl. No.: 17/756,537

(22) PCT Filed: Aug. 19, 2020

(86) PCT No.: PCT/CN2020/110025
§ 371 (c)(1),
(2) Date: May 26, 2022

(87) PCT Pub. No.: WO2021/103671
PCT Pub. Date: Jun. 3, 2021

(65) Prior Publication Data
US 2023/0339252 A1    Oct. 26, 2023

(30) Foreign Application Priority Data
Nov. 27, 2019 (CN) .......................... 201911184160.5

(51) Int. Cl.
*B42D 25/342* (2014.01)
*B42D 25/351* (2014.01)
(Continued)

(52) U.S. Cl.
CPC ......... *B42D 25/342* (2014.10); *B42D 25/351* (2014.10); *G02B 3/0056* (2013.01); *G02B 27/60* (2013.01)

(58) Field of Classification Search
CPC .. B42D 25/342; B42D 25/351; G02B 3/0056; G02B 27/60
See application file for complete search history.

(56) References Cited

U.S. PATENT DOCUMENTS

2016/0306390 A1    10/2016   Vertegaal et al.
2017/0113481 A1*    4/2017   Hersch .................. G02B 30/27

FOREIGN PATENT DOCUMENTS

CN    107614281 A    1/2018
CN    108541238 A    9/2018
(Continued)

*Primary Examiner* — Nathanael R Briggs
(74) *Attorney, Agent, or Firm* — Shumaker, Loop & Kendrick, LLP; James D. Miller (57) ABSTRACT

Disclosed are an optical anti-counterfeiting element and an anti-counterfeiting product. The optical anti-counterfeiting element includes a substrate; and a sampling layer formed on a first surface of the substrate, wherein the sampling layer is a sampling unit array composed of sampling units distributed according to a preset graphic-text information, the sampling unit array is aligned, in a preset manner, with a light-emitting pixel array positioned on a second surface side of the substrate and composed of light-emitting pixels, and the sampling unit array is configured for sampling the light-emitting pixel array, so as to show the preset graphic-text information of a single color or comprehensive colors of a plurality of colors among colors of the light-emitting
(Continued)

pixels, wherein the light-emitting pixels of the single color or the comprehensive colors of the plurality of colors show a moire magnification effect.

12 Claims, 9 Drawing Sheets (51) Int. Cl.
*G02B 3/00* (2006.01)
*G02B 27/60* (2006.01)

(56) References Cited

FOREIGN PATENT DOCUMENTS

| CN | 108656782 A | 10/2018 |
| CN | 09752862 A | 5/2019 |
| CN | 109789721 A | 5/2019 |
| WO | 2015011494 A1 | 1/2015 |
| WO | 2016141421 A1 | 9/2016 |
| WO | 2019076805 A1 | 4/2019 |

* cited by examiner

|G|B|R|G|B|R|G|B|R|G|B|R|G|B|
|G|B|R|G|B|R|G|B|R|G|B|R|G|B|
|G|B|R|G|B|R|G|B|R|G|B|R|G|B|
|G|B|R|G|B|R|G|B|R|G|B|R|G|B|
|G|B|R|G|B|R|G|B|R|G|B|R|G|B|
|G|B|R|G|B|R|G|B|R|G|B|R|G|B|
|G|B|R|G|B|R|G|B|R|G|B|R|G|B|
|G|B|R|G|B|R|G|B|R|G|B|R|G|B|

OPTICAL ANTI-COUNTERFEITING ELEMENT AND ANTI-COUNTERFEITING PRODUCT

CROSS-REFERENCE TO RELATED APPLICATIONS

This is a U.S. national phase patent application of PCT/CN2020/110025 filed Aug. 19, 2020 which claims the priority of Chinese Patent Application 201911184160.5 filed on Nov. 27, 2019, which is incorporated in its entirety herein by reference.

TECHNICAL FIELD

The disclosure relates to the technical field of optical anti-counterfeiting, and in particular to an optical anti-counterfeiting element and an anti-counterfeiting product.

BACKGROUND

In order to prevent counterfeits produced by scanning, copying and other means, an optical anti-counterfeiting technology is widely used in a variety of high safety or high value-added printed matter such as banknotes, cards and product packagings, which has achieved extremely excellent effects.

The prior art discloses an anti-counterfeiting element with a microlens array and a micro-graphic-text array on two surfaces of a substrate respectively. Specifically, the microlens array is used as a sampling tool to sample corresponding micro-graphic-text, and sampling points from different observation angles are designed, so as to show a visible dynamically magnified graphic. In order to facilitate public identification, the micro-graphic-text is usually colored such that anti-counterfeiting elements with color features can be observed in environments with point light sources or natural light. At present, there are mainly two kinds of coloring technique: one is used to scrape ink in micro-graphic-text, that is, to fill stroke grooves of the micro-graphic-text with colored ink. The other one is used to realize coloring by means of microstructures, that is, to fill the stroke grooves of the micro-graphic-text with finer microstructures, so as to show a black optical effect. However, since the micro-graphic-text has an immensely fine structure (about 2 m), the existing coloring process is extremely difficult to realize.

SUMMARY

The objective of the disclosure is an optical anti-counterfeiting element and an anti-counterfeiting product, which may realize preset graphic-text information of a preset color showing a moire magnification effect by means of a display screen of a mobile phone, a tablet computer, a computer, etc., thereby improving portability, identifiability and readability of an optical anti-counterfeiting feature.

In order to realize the above objective, one embodiment of the disclosure provides an optical anti-counterfeiting element. The optical anti-counterfeiting element includes a substrate, wherein the substrate includes a first surface and a second surface opposite each other; and a sampling layer formed on the first surface of the substrate, wherein the sampling layer is a sampling unit array composed of sampling units distributed according to a preset graphic-text information. The sampling unit array is aligned, in a preset manner, with a light-emitting pixel array positioned on a second surface side of the substrate and composed of light-emitting pixels, and the sampling unit array is configured for sampling the light-emitting pixel array, so as to show the preset graphic-text information of a single color or comprehensive colors of a plurality of colors among colors of the light-emitting pixels, wherein the light-emitting pixels of the single color or the comprehensive colors of the plurality of colors show a moire magnification effect.

In an embodiment, each of the sampling units has a period the same as that of each of the light-emitting pixels, and the sampling unit array is aligned with the light-emitting pixel array of the single color or the plurality of colors of the light-emitting pixels in a focusing manner or a light transmission manner.

In an embodiment, under the circumstance that an included angle between a sampling direction of the sampling units and a periodic arrangement direction of the light-emitting pixels is α, magnification power of the light-emitting pixels is $$M = \frac{1}{\sqrt{2-2\cos\alpha}}.$$

In an embodiment, each of the sampling units is a focusing element or a non-focusing element.

In an embodiment, under the circumstance that each of the sampling units is the focusing element, a focal length f of the focusing element satisfies the following equation:

$$f = \frac{n}{n-n_{pet}} * \frac{4h^2 + D^2}{16h},$$

wherein n is a refractive index of the focusing element, $n_{pet}$ is a refractive index of the substrate, h is a height of the focusing element, and D is a diameter of the focusing element.

In an embodiment, the focusing element is a microlens, and the non-focusing element is a shading screen with an opening.

In an embodiment, the microlens is a conventional ball lens, a conventional cylindrical lens, a fresnel ball lens or a fresnel cylindrical lens.

In an embodiment, under the circumstance that the preset graphic-text information is a first preset graphic-text information, the sampling layer is a first sampling unit array of the sampling unit array composed of sampling units distributed according to the first preset graphic-text information. Correspondingly, the first sampling unit array of the sampling unit array is configured for sampling the light-emitting pixels of a first color in the light-emitting pixel array, so as to show the first preset graphic-text information of the first color, wherein the first color is any one of red, green or blue.

In an embodiment, under the circumstance that the preset graphic-text information includes a second preset graphic-text information and third preset graphic-text information, the sampling layer includes: a second sampling unit array of the sampling unit array composed of sampling units distributed according to the second preset graphic-text information and a third sampling unit array of the sampling unit array composed of sampling units distributed according to the third preset graphic-text information. Correspondingly, the second sampling unit array of the sampling unit array is configured for sampling the light-emitting pixels of a second color in the light-emitting pixel array, so as to show the second preset graphic-text information of the second color;

and the third sampling unit array of the sampling unit array is configured for sampling the light-emitting pixels of a third color in the light-emitting pixel array, so as to show the third preset graphic-text information of the third color, wherein each of the second color and the third color is any one of red, green or blue.

In an embodiment, under the circumstance that the preset graphic-text information includes a fourth preset graphic-text information, a fifth preset graphic-text information and a sixth preset graphic-text information, the sampling layer includes a fourth sampling unit array of the sampling unit array composed of sampling units distributed according to the fourth preset graphic-text information, a fifth sampling unit array of the sampling unit array composed of sampling units distributed according to the fifth preset graphic-text information and a sixth sampling unit array of the sampling unit array composed of sampling units distributed according to the sixth preset graphic-text information. Correspondingly, the fourth sampling unit array of the sampling unit array is configured for sampling the light-emitting pixels of a fourth color in the light-emitting pixel array, so as to show the fourth preset graphic-text information of the fourth color; the fifth sampling unit array of the sampling unit array is configured for sampling the light-emitting pixels of a fifth color in the light-emitting pixel array, so as to show the fifth preset graphic-text information of the fifth color; and the sixth sampling unit array of the sampling unit array is configured for sampling the light-emitting pixels of a sixth color in the light-emitting pixel array, so as to show the sixth preset graphic-text information of the sixth color, wherein each of the fourth color, the fifth color and the sixth color is any one of red, green or blue.

In an embodiment, under the circumstance that the preset graphic-text information includes a seventh preset graphic-text information, the sampling layer includes a seventh sampling unit array of the sampling unit array composed of sampling units distributed according to the seventh preset graphic-text information. Correspondingly, the seventh sampling unit array of the sampling unit array is configured for sampling the light-emitting pixels of a plurality of colors in the light-emitting pixel array, so as to show the seventh preset graphic-text information of comprehensive colors of the plurality of colors, wherein the plurality of colors are any two or more of red, green or blue.

In another embodiment of the disclosure provides an anti-counterfeiting product. The anti-counterfeiting product includes the optical anti-counterfeiting element.

In an embodiment, the anti-counterfeiting product includes a banknote, an identity card, a bank card or a draft.

By means of the above technical solutions, in the disclosure, the sampling layer is creatively designed as the sampling unit array composed of the sampling units distributed according to the preset graphic-text information, and then the sampling unit array is aligned, in a preset manner, with the light-emitting pixel array positioned at the other side of the substrate and samples the light-emitting pixel array such that the preset graphic-text information of the preset color showing the moire magnification effect is able to be observed. Thus, the disclosure may realize the preset graphic-text information of the preset color showing the moire magnification effect by means of the display screen of the mobile phone, the tablet computer, the computer, etc., thereby improving the portability, identifiability and readability of the optical anti-counterfeiting feature.

Other features and advantages of the disclosure will be described in detail in the specific implementations that follows.

BRIEF DESCRIPTION OF THE DRAWINGS

The accompanying drawings, which are used for providing further understanding of the utility model and constitute a part of the description, together with the following specific implementations, serve to explain the utility model instead of limiting same. In the accompanying drawings:

FIG. 2 (a) shows a schematic diagram of sampling of a focusing element array provided in an embodiment of the disclosure;

FIG. 2 (b) shows a schematic diagram of sampling of a non-focusing element array provided in an embodiment of the disclosure;

FIG. 3 (a) shows a top view of a conventional ball lens array provided in an embodiment of the disclosure;

FIG. 3 (b) shows a top view of a patterned conventional ball lens array provided in an embodiment of the disclosure;

FIG. 3 (c) shows a schematic diagram of a light-emitting pixel array (in a shape of a rhombus) provided in an embodiment of the disclosure;

FIG. 3 (d) shows a schematic diagram of an optical image of an optical anti-counterfeiting element provided in an embodiment of the disclosure;

FIG. 4 (a) shows a top view of a conventional cylindrical lens array provided in an embodiment of the disclosure;

FIG. 4 (b) shows a top view of a patterned conventional cylindrical lens array provided in an embodiment of the disclosure;

FIG. 4 (c) shows a schematic diagram of a light-emitting pixel array (in a shape of a rectangle) provided in an embodiment of the disclosure;

FIG. 4 (d) shows a schematic diagram of an optical image of an optical anti-counterfeiting element provided in an embodiment of the disclosure;

FIG. 5 (a) shows a top view of two conventional ball lens arrays provided in an embodiment of the disclosure;

FIG. 5 (b) shows a top view of two patterned conventional ball lens arrays provided in an embodiment of the disclosure;

FIG. 5 (c) shows a schematic diagram of a light-emitting pixel array (in a shape of a rectangle) provided in an embodiment of the disclosure;

FIG. 5 (d) shows a schematic diagram of an optical image of an optical anti-counterfeiting element provided in an embodiment of the disclosure;

FIG. 6 (a) shows a top view of three conventional ball lens arrays provided in an embodiment of the disclosure;

FIG. 6 (b) shows a top view of three patterned conventional ball lens arrays provided in an embodiment of the disclosure;

FIG. 6 (c) shows a schematic diagram of a light-emitting pixel array (in a shape of a rectangle) provided in an embodiment of the disclosure;

FIG. 6 (d) shows a schematic diagram of an optical image of an optical anti-counterfeiting element provided in an embodiment of the disclosure;

FIG. 7 (a) shows a top view of a conventional cylindrical lens array provided in an embodiment of the disclosure;

FIG. 7 (b) shows a top view of a patterned conventional cylindrical lens array provided in an embodiment of the disclosure;

FIG. 7 (c) shows a schematic diagram of a light-emitting pixel array (in a shape of a rectangle) provided in an embodiment of the disclosure;

FIG. 7 (d) shows a schematic diagram of an optical image of an optical anti-counterfeiting element provided in an embodiment of the disclosure;

FIG. 8 (a) shows a top view of an optical anti-counterfeiting element (a fresnel lens) provided in an embodiment of the disclosure;

FIG. 8 (b) shows a top view of an optical anti-counterfeiting element (a fresnel cylindrical lens) provided in an embodiment of the disclosure; and FIG. 8 (c) shows a top view of an optical anti-counterfeiting element (a fresnel ball lens) provided in an embodiment of the disclosure.

DESCRIPTION OF THE REFERENCE NUMERALS

1. Substrate; 2. Sampling layer
11. First surface; 12. Second surface

DETAILED DESCRIPTION OF THE EMBODIMENTS

The specific implementations of the disclosure are described in detail below in conjunction with the accompanying drawings. It should be understood that the specific implementations described herein are merely illustrative of the disclosure and are not intended to limit the disclosure.

Before the embodiments of the disclosure are introduced, an optical moire magnification effect is simply defined. The moire magnification effect means that periodically arranged sampling elements and micro-graphic-text (such as a graphic composed of light-emitting pixel arrays) are mutually superposed according to a certain angle, and sampling element arrays are configured for carrying out spatial sampling on micro-graphic-text arrays (such as light-emitting pixel arrays), so as to form graphic-text with a pixel magnification effect.

Figure 1:
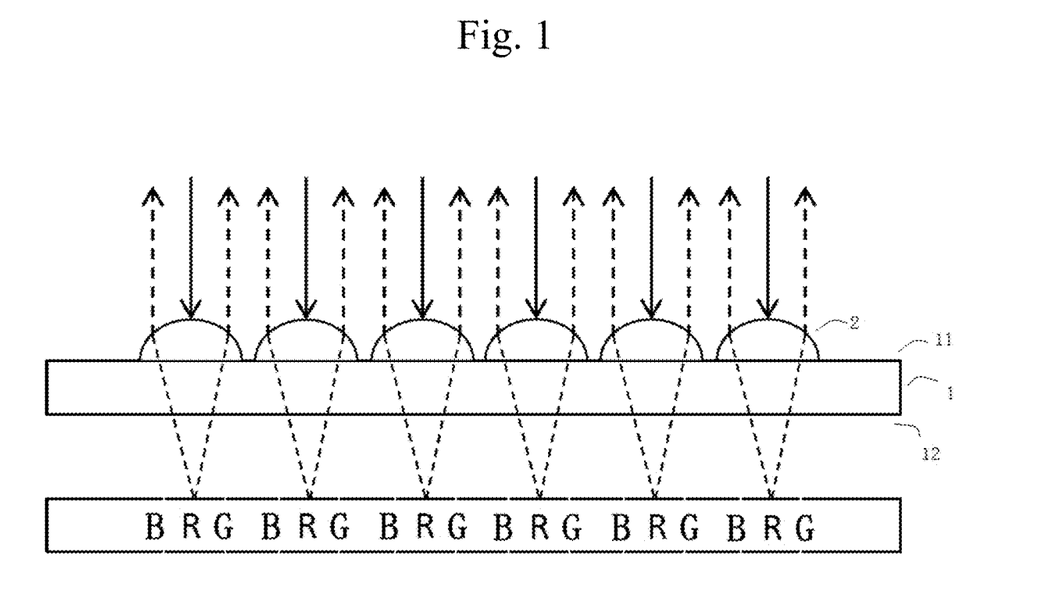
FIG. 1 shows a structural diagram of an optical anti-counterfeiting element provided in an embodiment of the disclosure.

FIG. 1 is a structural schematic diagram of an optical anti-counterfeiting element provided in an embodiment of the disclosure. As shown in FIG. 1, the optical anti-counterfeiting element may include a substrate 1, wherein the substrate 1 includes a first surface 11 and a second surface 12 opposite each other; and a sampling layer 2 formed on the first surface 11 of the substrate 1, wherein the sampling layer 2 is a sampling unit array composed of sampling units distributed according to a preset graphic-text information. The sampling unit array is aligned, in a preset manner, with a light-emitting pixel array positioned on a second surface 12 side of the substrate 1 and composed of light-emitting pixels, and the sampling unit array is configured for sampling the light-emitting pixel array, so as to show the preset graphic-text information of a single color or comprehensive colors of a plurality of colors among colors of the light-emitting pixels, wherein the light-emitting pixels of the single color or the comprehensive colors of the plurality of colors show a moire magnification effect.

A geometric shape of the substrate 1 is able to be one or a combination of more than one of a round, a rectangle, a triangle and a regular hexagon. The substrate 1 is able to be made of polyethylene terephthalate (PET), polycarbonate (PC), polymethyl methacrylate (PMMA), polyethylene (PE) or polypropylene (PP).

Figure 2:
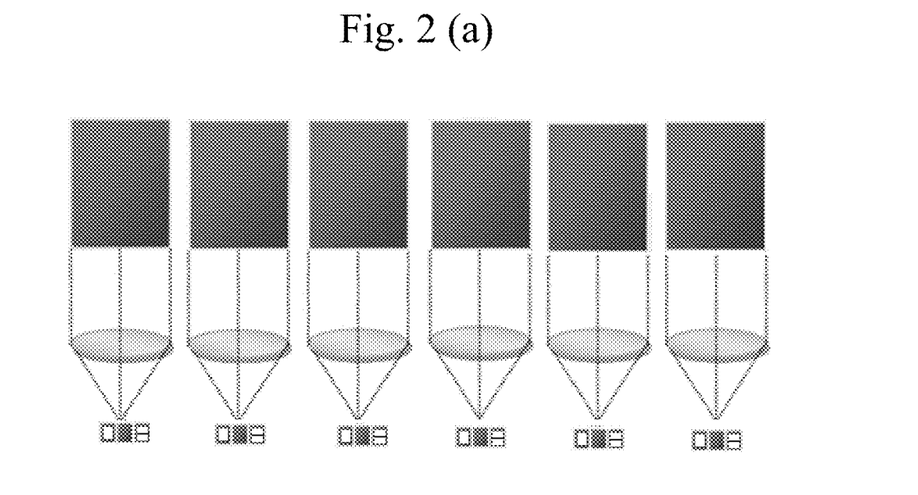
Figure 3:
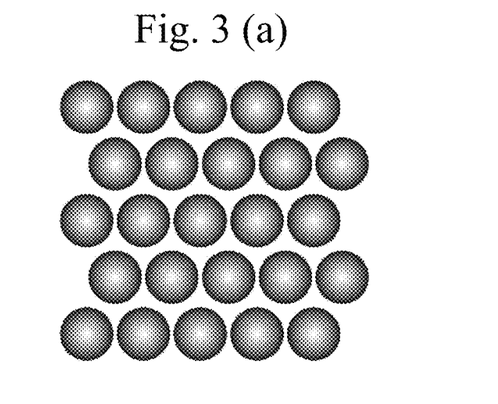
Figure 4:
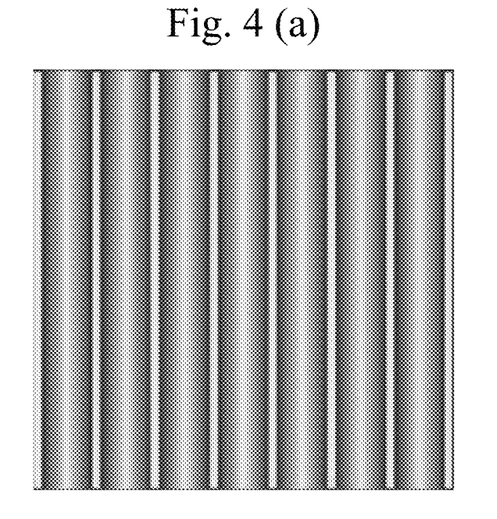
Figure 8:
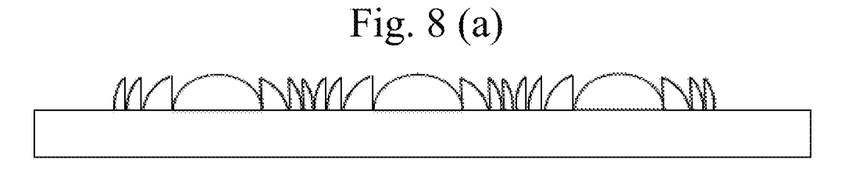

The sampling units are able to be a focusing element or a non-focusing element. Specifically, the focusing element is able to be a microlens, which is as shown in FIG. 2 (a). As shown in FIG. 2 (a), when a focal point of the microlens is aligned with the pixel of the same color in the light-emitting pixel array, the microlens array composed of the microlenses collects the pixel of a single color showing a moire magnification effect. The non-focusing element is a shading screen with an opening, which is as shown in FIG. 2 (b). As shown in FIG. 2(b), when the opening of the shading screen is aligned with the pixels of the same color in the light-emitting pixel array, the array composed of the shading screen collects the pixels of a single color showing a moire magnification effect. Of course, if the microlens array is designed as graphic-text information having a practical meaning, the microlens array collects the graphic-text information of a single color showing a moire magnification effect. Further, the microlens is a conventional ball lens (as shown in FIG. 3 (a), 5 (a) or 6 (a)), a conventional cylindrical lens (as shown in FIG. 4 (a)), a fresnel ball lens (as shown in FIG. 8 (b)) or a fresnel cylindrical lens (as shown in FIG. 8 (c)).

At present, there are mainly two kinds of display screens (liquid crystal display (LCD) screen and organic light-emitting display (OLED) screen) of mobile phones, and colors of light-emitting pixels of the display screens may include red (R), green (G) and blue (B). When a display screen of a mobile phone is highly bright, R, G and B pixels are all lighted up and appear in a comprehensive effect of three colors as a whole (that is, in white). A distribution rule of a light-emitting pixel array of the OLED screen is a rhombic arrangement, which is as shown in FIG. 3 (c). Specifically, a first row is periodically arranged according to R, G and B pixels and the three kinds of light-emitting pixels of R, G and B have the same size, a second row is arranged in the same manner as the first row but is translated rightward by a half-pixel size in a horizontal axis direction, and thus a rhombic arrangement is formed. Of course, R, G and B pixels in the second row are able to be arranged different from that in the first row, for example, the first row are able to be periodically arranged according to R and B pixels, and the second row are able to be arranged only according to G pixels. A distribution rule of a light-emitting pixel array of the LCD screen is a rectangular arrangement, which is as shown in FIG. 4 (c). Specifically, each row is periodically arranged according to R, G and B pixels, and each of the same light-emitting pixels in different row has the same position in the horizontal axis direction.

Figure 6:
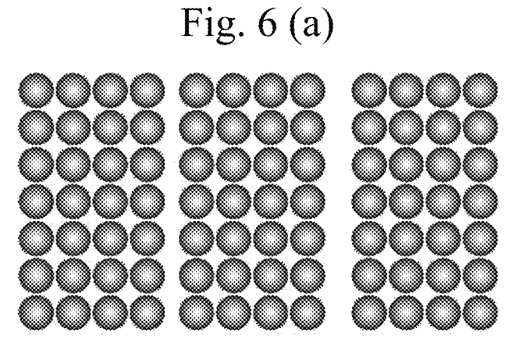
Figure 7:
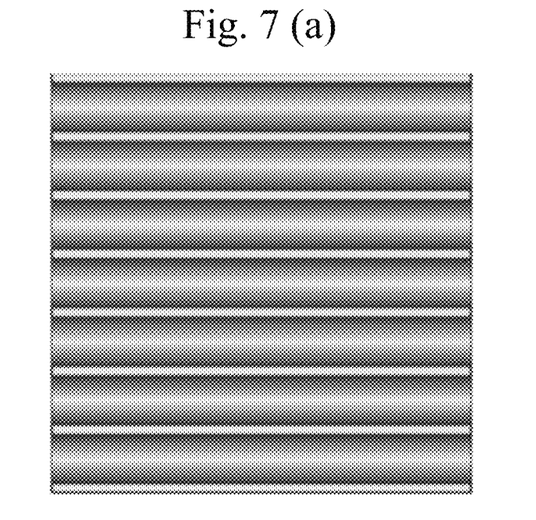

Generally, the display screen of the mobile phone has resolution of 600-3000 dpi and a pixel size less than 50 km. In order to enable the sampling layer to collect graphic-text showing a moire magnification effect, a period of the sampling units are able to be designed the same as a period of the light-emitting pixels (that is, a period of three kinds of pixels of red, green and blue), such that the sampling units may have a period ranging from 30 m to 100 m and preferably ranging from 30 m to 60 m. Correspondingly, the sampling unit array is able to be aligned with the light-emitting pixel array of the single color or the plurality of colors of the light-emitting pixels in a focusing manner or a light transmission manner, and is configured for sampling the light-emitting pixel array, so as to show the preset graphic-text information of the single color or the comprehensive colors of the plurality of colors. For example, when the sampling layer 2 is a sampling unit array composed of sampling units distributed according to a letter "A", if the focal point of the sampling unit array is aligned with the red pixel (as shown in FIG. 3 (c)) in the light-emitting pixels, a red graphic A showing a moire magnification effect is shown as in FIG. 3 (d). When the sampling layer 2 is a sampling unit array composed of sampling units distributed according to letters "R", "G" and "B", if the focal point of a part of the sampling unit array composed of sampling units distributed according to the letter "R" is aligned with the red pixel in the light-emitting pixels, and the focal point of a part of the sampling unit array composed of sampling units distributed according to the letter "G" is aligned with the green pixel in the light-emitting pixels, and the focal point of the partial sampling unit array composed of sampling units distributed according to the letter "B" is aligned with the blue pixel in the light-emitting pixels (as shown in FIG. 6 (c)), then the red graphic R, the green graphic G and the blue graphic B showing the moire magnification effect are shown as in FIG. 6 (d). When the sampling layer 2 is a sampling unit array composed of sampling units distributed according to the letter "A", if the focal point of a part of the sampling unit array composed of sampling units distributed according to the letter "A" is aligned with pixels of three colors in the light-emitting pixels (as shown in FIG. 7 (c)), a white graphic A showing a moire magnification effect is shown as in FIG. 7 (d).

Under the circumstance that each of the sampling units is the focusing element, a focal length f of the focusing element satisfies the following equation:

$$f = \frac{n}{n - n_{pet}} * \frac{4h^2 + D^2}{16h},$$

wherein n is a refractive index of the focusing element, $n_{pet}$ is a refractive index of the substrate, h is a height of the focusing element, and D is a diameter of the focusing element. For example, the sampling element has a focal length ranging from 50 m to 500 km. Specifically, the focal length of the focusing element is able to be the sum of a thickness of the substrate and a thickness (even considering a thickness of a protective film on an upper surface of the display screen) of a display screen.

In the process of observing the anti-counterfeiting feature, the optical anti-counterfeiting element needs to be rotated to meet the requirement that a focal point or a light transmission port of the sampling units is accurately aligned with the pixel of a single color in the light-emitting pixel array. Under the circumstance that an included angle between a sampling direction (that is, a periodic arrangement direction of the microlenses (taking the cylindrical lens as an example, the sampling direction of the cylindrical lens is a direction perpendicular to the infinite direction of the cylindrical lens)) of the sampling units and a periodic arrangement direction (an arrangement direction of red, green and blue pixels) of the light-emitting pixels is a, magnification power of the light-emitting pixels is $$M = \frac{1}{\sqrt{2 - 2\cos\alpha}}.$$

Particularly, when the sampling direction of the sampling units is parallel to the arrangement direction of the red, green and blue pixels, the light-emitting pixels are able to be magnified by infinite times, such that the shown graphic is super clear.

Specifically, a specific structure and an imaging result of the optical anti-counterfeiting element are described in detail below by means of four embodiments. Unless a specific size is specifically stated, the sampling units may have a period the same as that of the light-emitting pixels (that is, if each of the light-emitting pixels has a period of 49.15 m (the light-emitting pixel has a size of 49.15/3 km), each of the sampling units has a period of 49.15 km), and may have a thickness of 3 km.

Embodiment 1

Under the circumstance that the preset graphic-text information is a first preset graphic-text information, the sampling layer is a first sampling unit array of the sampling unit array composed of sampling units distributed according to the first preset graphic-text information (such as a letter "A"). Correspondingly, the first sampling unit array of the sampling unit array is configured for sampling the light-emitting pixels of a first color in the light-emitting pixel array, so as to show the first preset graphic-text information (such as the letter "A") of the first color. The first color is any one of red, green or blue.

As shown in FIG. 3 (a), if the first sampling unit array of the sampling unit array is a conventional ball lens array (that is a periodically arranged array), and a focal point of the conventional ball lens array is only aligned with the blue pixels, the conventional ball lens array may carry out sampling to show a blue letter "A" showing a moire magnification effect, which is as shown in FIG. 3 (d). As shown in FIG. 4 (a), if the first sampling unit array of the sampling unit array is a conventional cylindrical lens array, and a focal point of the conventional cylindrical lens array is only aligned with the blue pixels, the conventional cylindrical lens array may carry out sampling to show a blue letter "A" showing a moire magnification effect, which is as shown in FIG. 4 (d).

Of course, the focal point of the conventional ball lens or the conventional cylindrical lens array may also be only aligned with the green (or red) pixels, thus, the conventional ball lens array may carry out sampling to show a green (or red) letter "A" showing a moire magnification effect.

Embodiment 2

Under the circumstance that the preset graphic-text information includes a second preset graphic-text information and a third preset graphic-text information, the sampling layer includes: a second sampling unit array of the sampling unit array composed of sampling units distributed according to the second preset graphic-text information and a third sampling unit array of the sampling unit array composed of sampling units distributed according to the third preset graphic-text information. Correspondingly, the second sampling unit array of the sampling unit array is configured for sampling the light-emitting pixels of a second color in the light-emitting pixel array, so as to show the second preset graphic-text information of the second color; and the third sampling unit array of the sampling unit array is configured for sampling the light-emitting pixels of a third color in the light-emitting pixel array, so as to show the third preset graphic-text information of the third color, wherein each of the second color and the third color is any one of red, green or blue.

Figure 5:
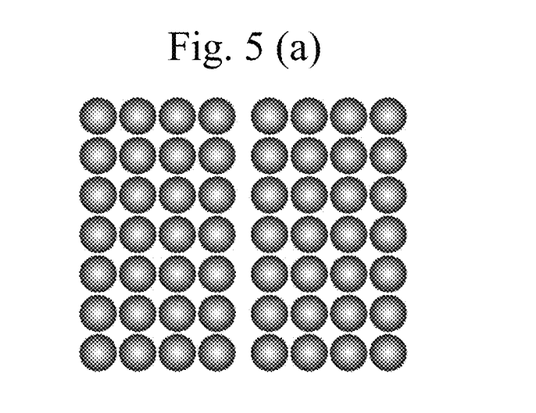

As shown in FIG. 5 (b), if the second sampling unit array of the sampling unit array and the third sampling unit array of the sampling unit array are both conventional ball lens arrays. In order to enable the focal point of the second sampling unit array of the sampling unit array to be only aligned with the red pixels and the focal point of the third sampling unit array of the sampling unit array to be only aligned with the green pixels (as shown in FIG. 5 (c)), a spacing between the second sampling unit array of the sampling unit array (that is, a partially periodically arranged array) and the third sampling unit array of the sampling unit array (that is, a partially periodically arranged array) to be (N1+⅓) times (N1=0 or a positive integer) a period of the light-emitting pixels, for example, at least ⅓ times (that is, one light-emitting pixel) the period of the light-emitting pixels. Thus, by using the second sampling unit array of the sampling unit array for sampling, a red letter "R" showing a moire magnification effect is able to be shown; and by using the third sampling unit array of the sampling unit array for sampling, a green letter "G" showing a moire magnification effect is able to be shown, which is as shown in FIG. 5 (d). Thus, the red letter "R" and the green letter "G" showing a moire magnification effect is able to be observed.

Of course, in order to enable the focal point of the second sampling unit array of the sampling unit array to be only aligned with the red pixels and the focal point of the third sampling unit array of the sampling unit array to be only aligned with the blue pixels, a spacing between the second sampling unit array of the sampling unit array and the third sampling unit array of the sampling unit array to be (N1+⅔) times (N1=0 or a positive integer) a period of the light-emitting pixels, for example, at least ⅔ times (that is, two light-emitting pixels) the period of the light-emitting pixels. Thus, by using the second sampling unit array of the sampling unit array for sampling, a red letter "R" showing a moire magnification effect is able to be shown; and by using the third sampling unit array of the sampling unit array for sampling, a blue letter "B" showing a moire magnification effect is able to be shown. Thus, the red letter "R" and the blue letter "B" showing a moire magnification effect is able to be observed.

Alternatively, in order to enable the focal point of the second sampling unit array of the sampling unit array to be only aligned with the green pixels and the focal point of the third sampling unit array of the sampling unit array to be only aligned with the blue pixels, a spacing between the second sampling unit array of the sampling unit array and the third sampling unit array of the sampling unit array to be (N1+⅓) times (N1=0 or a positive integer) a period of the light-emitting pixels, for example, at least ⅓ times (that is, one light-emitting pixel) the period of the light-emitting pixels. Thus, by using the second sampling unit array of the sampling unit array for sampling, a green letter "G" showing a moire magnification effect is able to be shown; and by using the third sampling unit array of the sampling unit array for sampling, a blue letter "B" showing a moire magnification effect is able to be shown. Thus, the green letter "G" and the blue Letter "B" showing a moire magnification effect is able to be observed.

Similarly, the above conventional ball lens array may be replaced with a conventional cylindrical lens array, and the same phenomenon as described above may be observed, so the description is omitted here.

Embodiment 3

Under the circumstance that the preset graphic-text information includes a fourth preset graphic-text information, a fifth preset graphic-text information and a sixth preset graphic-text information, the sampling layer includes: a fourth sampling unit array of the sampling unit array composed of sampling units distributed according to the fourth preset graphic-text information, a fifth sampling unit array of the sampling unit array composed of sampling units distributed according to the fifth preset graphic-text information and a sixth sampling unit array of the sampling unit array composed of sampling units distributed according to the sixth preset graphic-text information.

Correspondingly, the fourth sampling unit array of the sampling unit array is configured for sampling the light-emitting pixels of a fourth color in the light-emitting pixel array, so as to show the fourth preset graphic-text information of the fourth color; the fifth sampling unit array of the sampling unit array is configured for sampling the light-emitting pixels of a fifth color in the light-emitting pixel array, so as to show the fifth preset graphic-text information of the fifth color; and the sixth sampling unit array of the sampling unit array is configured for sampling the light-emitting pixels of a sixth color in the light-emitting pixel array, so as to show the sixth preset graphic-text information of the sixth color, wherein each of the fourth color, the fifth color and the sixth color is any one of red, green or blue.

As shown in FIG. 6 (b), the fourth sampling unit array of the sampling unit array, the fifth sampling unit array of the sampling unit array and the sixth sampling unit array of the sampling unit array are all conventional ball lens arrays. In order to enable the focal point of the fourth sampling unit array of the sampling unit array to be only aligned with the red pixels, the focal point of the fifth sampling unit array of the sampling unit array to be only aligned with the green pixels and the focal point of the sixth sampling unit array of the sampling unit array to be only aligned with the blue pixels (as shown in FIG. 6 (c)), a spacing between the fourth sampling unit array of the sampling unit array (that is, a partially periodically arranged array) and the fifth sampling unit array of the sampling unit array (that is, a partially periodically arranged array) to be (N2+⅓) times (N2=0 or a positive integer) a period of the light-emitting pixels, for example, at least ⅓ times (that is, one light-emitting pixel) the period of the light-emitting pixels; and a spacing between the fifth sampling unit array of the sampling unit array and the sixth sampling unit array of the sampling unit array (that is, a partially periodically arranged array) to be (N3+⅓) times (N3=0 or a positive integer) a period of the light-emitting pixels, for example, at least ⅓ times (that is, one light-emitting pixel) the period of the light-emitting pixels. Thus, by using the fourth sampling unit array of the sampling unit array for sampling, a red letter "R" showing a moire magnification effect is able to be shown; by using the fifth sampling unit array of the sampling unit array for sampling, a green letter "G" showing a moire magnification effect is able to be shown; and by using the sixth sampling unit array of the sampling unit array for sampling, a blue letter "B" showing a moire magnification effect is able to be shown, which is as shown in FIG. 6 (d). Thus, the red letter "R", the green letter "G" and the blue letter "B" showing a moire magnification effect are able to be observed.

Similarly, the above conventional ball lens array may be replaced with a conventional cylindrical lens array, and the same phenomenon as described above may be observed, so the description is omitted here.

Embodiment 4

Under the circumstance that the preset graphic-text information includes seventh preset graphic-text information, the sampling layer includes: a seventh sampling unit array of the sampling unit array composed of sampling units distributed according to the seventh preset graphic-text information (such as a letter "A"). Correspondingly, the seventh sampling unit array of the sampling unit array is configured for sampling the light-emitting pixels of a plurality of colors in the light-emitting pixel array, so as to show the seventh preset graphic-text information (such as the letter "A") of comprehensive colors of the plurality of colors. The plurality of colors are any two or more of red, green or blue.

As shown in FIG. 7 (a), if the seventh sampling unit array of the sampling unit array is a conventional cylindrical lens array, a focal point of the conventional cylindrical lens array is only aligned with all the pixels, thus, the conventional cylindrical lens array may carry out sampling to show a white letter "A" showing a moire magnification effect, which is as shown in FIG. 7 (d). That is, by rotating the optical anti-counterfeiting element in FIG. 4 (b) by 90 degrees, the focal point of the conventional cylindrical lens array is aligned with the light-emitting pixels of three colors (as shown in FIG. 7 (c)), and the three colors are combined to be white such that the white letter "A" showing the moire magnification effect is able to be shown, which is as shown in FIG. 7 (d).

Moreover, if the seventh sampling unit array of the sampling unit array is a conventional ball lens array (not shown), and the focal point of the conventional cylindrical lens array is aligned with all the pixels, a period of the sampling units is set to be equal to a size of the light-emitting pixels (for example, the sampling units may have a period of 49.15/3 μm). Thus, by using the conventional cylindrical lens array for sampling, the white letter "A" showing the moire magnification effect is able to be shown.

It should be noted that if the light-emitting pixel array in each of the above embodiments is not located on a focal plane of the optical anti-counterfeiting element, the sampling element may converge light rays on the light-emitting pixels of two or three colors, and the other colorful macroscopic graphic-text information is able to be shown.

In summary, the above embodiments show that: when the optical anti-counterfeiting element is placed on a display screen of a mobile phone, macroscopic graphic-text information with three-dimensional preset colors (a single color or a plurality of colors) having practical meanings are able to be formed.

In order to enable the above optical anti-counterfeiting element to adapt to an existing product carrier commonly used, generally, thicknesses of the sampling element and the substrate need to meet certain requirements. For example, a thickness (or a height) of the sampling element may not be overlarge, otherwise the sampling element may not be embedded in paper or attached to the carrier to cause an uneven consequence. Therefore, the sampling units may have a thickness of 1 m to 15 m, and the thickness of the substrate is able to be adaptively adjusted to meet the requirement of the sum of the thicknesses of the sampling units and the substrate. The fresnel lens in FIG. 8 (a) may have a period of 49.15 m and a thickness of 1 m. Compared with the conventional ball lens in FIG. 3 (a), the thickness of the fresnel lens in FIG. 8 (a) is reduced by 2 μm, and tolerance is increased for a flatness requirement of a subsequent production process. Moreover, the fresnel lens is able to be a one-dimensional lens (such as the fresnel cylindrical lens shown in FIG. 8 (b)) or a two-dimensional lens (such as the fresnel ball lens shown in FIG. 8 (c)).

A preparation method for the optical anti-counterfeiting element may include the following steps: (1) set a period of a microlens array, magnification power M, a diameter D of a microlens and a height h of the microlens according to an arrangement rule and sizes of red, green and blue pixels of a display screen and a thickness of a substrate; (2) generate a grey graphic by calculating the above parameters, and make a plate by means of laser direct engraving equipment; (3) form a microlens array layer on a first surface of a substrate film through an ultraviolet mold pressing technology; and (4) make a second surface of the substrate film tightly attached to the display screen of a light-emitting device, and carry out proper rotation to obtain a desired optical anti-counterfeiting element.

In conclusion, in the disclosure, the sampling layer is creatively designed as the sampling unit array composed of the sampling units distributed according to the preset graphic-text information, and then the sampling unit array is aligned, in a preset manner, with the light-emitting pixel array positioned at the other side of the substrate and samples the light-emitting pixel array such that the preset graphic-text information of a preset color showing the moire magnification effect are able to be observed. Thus, the disclosure may realize the preset graphic-text information of the preset color showing the moire magnification effect by means of the display screen of the mobile phone, the tablet computer, the computer, etc., thereby improving the portability, identifiability and readability of the optical anti-counterfeiting feature.

An embodiment of the disclosure further provides an anti-counterfeiting product. The anti-counterfeiting product may include the above optical anti-counterfeiting element. The optical anti-counterfeiting element is able to be placed into the above the anti-counterfeiting product in manners of a windowing security line, a windowing sticker, a label, etc. The anti-counterfeiting product may include products of banknotes, identity cards, bank cards, drafts, securities, etc, which have high added value.

The preferred implementations of the disclosure are described in detail above with reference to the accompanying drawings. However, the disclosure is not limited to specific details of the above implementations. Within the scope of the technical concept of the disclosure, various simple modifications are able to be made to the technical solutions of the disclosure, and these simple modifications all fall within the scope of protection of the disclosure.

It should also be noted that various specific technical features described in the above specific implementations are able to be combined in any suitable manner, without contradiction. In order to avoid unnecessary repetition, the disclosure will not describe various possible combinations separately.

In addition, various different implementations of the disclosure may also be combined randomly, so long as same do not deviate from the idea of the disclosure, and same should also be regarded as disclosed in the disclosure.

What is claimed is:

1. An optical anti-counterfeiting element, comprising:
a substrate, wherein the substrate comprises a first surface and a second surface opposite each other; and
a sampling layer formed on the first surface of the substrate, wherein the sampling layer is a sampling unit array composed of sampling units distributed according to a preset graphic-text information, each of the sampling units is a cylindrical lens,
the sampling unit array is alignable, in a preset manner, with a light-emitting pixel array positionable on a second surface side of the substrate and composed of light-emitting pixels, and the sampling unit array is configured for sampling the light-emitting pixel array, so as to show the preset graphic-text information of a single color or comprehensive colors of a plurality of colors among colors of the light-emitting pixels, each of the sampling units has a period the same as that of each of the light-emitting pixels, wherein the light-emitting pixels of the single color or the comprehensive colors of the plurality of colors show a moire magnification effect, wherein the light-emitting pixel array is comprised of red pixels, green pixels, and blue pixels, and the sampling unit array is alignable with the light-emitting pixel array of the single color or the plurality of colors of the light-emitting pixels in a focusing manner or a light transmission manner, wherein the sampling unit array is rotated 90 degrees, the color of the preset graphic-text information is white.

2. The optical anti-counterfeiting element according to claim 1, wherein under the circumstance that an included angle between a sampling direction of the sampling units and a periodic arrangement direction of the light-emitting pixels is a, magnification power of the light-emitting pixels is $$M = \frac{1}{\sqrt{2 - 2\cos\alpha}}.$$

3. The optical anti-counterfeiting element according to claim 1, wherein under the circumstance that each of the sampling units is the focusing element, a focal length f of the focusing element satisfies the following equation $$f = \frac{n}{n - n_{pet}} * \frac{4h^2 + D^2}{16h},$$

wherein n is a refractive index of the focusing element, $n_{pet}$ is a refractive index of the substrate, h is a height of the focusing element, and D is a diameter of the focusing element.

4. The optical anti-counterfeiting element according to claim 1, wherein under the circumstance that the preset graphic-text information is a first preset graphic-text information, the sampling layer is a first sampling unit array of the sampling unit array composed of sampling units distributed according to the first preset graphic-text information, and correspondingly, the first sampling unit array of the sampling unit array is configured for sampling the light-emitting pixels of a first color in the light-emitting pixel array, so as to show the first preset graphic-text information of the first color, wherein the first color is any one of red, green or blue.

5. The optical anti-counterfeiting element according to claim 1, wherein under the circumstance that the preset graphic-text information comprises a second preset graphic-text information and a third preset graphic-text information, the sampling layer comprises a second sampling unit array of the sampling unit array composed of sampling units distributed according to the second preset graphic-text information and a third sampling unit array of the sampling unit array composed of sampling units distributed according to the third preset graphic-text information, and correspondingly, the second sampling unit array of the sampling unit array is configured for sampling the light-emitting pixels of a second color in the light-emitting pixel array, so as to show the second preset graphic-text information of the second color; and the third sampling unit array of the sampling unit array is configured for sampling the light-emitting pixels of a third color in the light-emitting pixel array, so as to show the third preset graphic-text information of the third color, wherein each of the second color and the third color is any one of red, green or blue.

6. The optical anti-counterfeiting element according to claim 1, wherein under the circumstance that the preset graphic-text information comprises a fourth preset graphic-text information, a fifth preset graphic-text information and a sixth preset graphic-text information, the sampling layer comprises a fourth sampling unit array of the sampling unit array composed of sampling units distributed according to the fourth preset graphic-text information, a fifth sampling unit array of the sampling unit array composed of sampling units distributed according to the fifth preset graphic-text information and a sixth sampling unit array of the sampling unit array composed of sampling units distributed according to the sixth preset graphic-text information, and correspondingly, the fourth sampling unit array of the sampling unit array is configured for sampling the light-emitting pixels of a fourth color in the light-emitting pixel array, so as to show the fourth preset graphic-text information of the fourth color; the fifth sampling unit array of the sampling unit array is configured for sampling the light-emitting pixels of a fifth color in the light-emitting pixel array, so as to show the fifth preset graphic-text information of the fifth color; and the sixth sampling unit array of the sampling unit array is configured for sampling the light-emitting pixels of a sixth color in the light-emitting pixel array, so as to show the sixth preset graphic-text information of the sixth color, wherein each of the fourth color, the fifth color and the sixth color is any one of red, green or blue.

7. The optical anti-counterfeiting element according to claim 1, wherein under the circumstance that the preset graphic-text information comprises a seventh preset graphic-text information, the sampling layer comprises a seventh sampling unit array of the sampling unit array composed of sampling units distributed according to the seventh preset graphic-text information, and correspondingly, the seventh sampling unit array of the sampling unit array is configured for sampling the light-emitting pixels of a plurality of colors in the light-emitting pixel array, so as to show the seventh preset graphic-text information of comprehensive colors of the plurality of colors, wherein the plurality of colors are any two or more of red, green or blue.

8. An anti-counterfeiting product, comprising the optical anti-counterfeiting element according to claim 1.

9. The anti-counterfeiting product according to claim 8, comprising a banknote, an identity card, a bank card or a draft.

10. The anti-counterfeiting product according to claim 8, wherein under the circumstance that an included angle between a sampling direction of the sampling units and a periodic arrangement direction of the light-emitting pixels is a, magnification power of the light-emitting pixels is $$M = \frac{1}{\sqrt{2 - 2\cos\alpha}}.$$

11. The anti-counterfeiting product according to claim 8, wherein under the circumstance that each of the sampling units is the focusing element, a focal length f of the focusing element satisfies the following equation $$f = \frac{n}{n - n_{pet}} * \frac{4h^2 + D^2}{16h},$$

wherein n is a refractive index of the focusing element, $n_{pet}$ is a refractive index of the substrate, h is a height of the focusing element, and D is a diameter of the focusing element.

12. The anti-counterfeiting product according to claim 8, wherein under the circumstance that the preset graphic-text information is a first preset graphic-text information, the sampling layer is a first sampling unit array of the sampling unit array composed of sampling units distributed according to the first preset graphic-text information, and correspondingly, the first sampling unit array of the sampling unit array is configured for sampling the light-emitting pixels of a first color in the light-emitting pixel array, so as to show the first preset graphic-text information of the first color, wherein the first color is any one of red, green or blue.

* * * * *